US012566889B2

(12) United States Patent
Fisher et al.

(10) Patent No.: US 12,566,889 B2
(45) Date of Patent: Mar. 3, 2026

(54) LARGE LANGUAGE MODEL-AGNOSTIC DATA ANONYMIZATION

(71) Applicants:Aracor Inc, Miami, FL (US); Constructor Education and Research Genossenschaft, Schaffhausen (CH)

(72) Inventors: Katya Fisher, Miami, FL (US); Serg Bell, Costa del Sol (SG); Lucas Puvis de Chavannes, Barcelona (ES); Irina Krotova, Berlin (DE)

(73) Assignees: Aracor Inc, Miami, FL (US); Constructor Education and Research Genossenschaft, Schaffhausen (CH)

( * ) Notice: Subject to any disclaimer, the term of this patent is extended or adjusted under 35 U.S.C. 154(b) by 130 days.

(21) Appl. No.: 18/624,841

(22) Filed: Apr. 2, 2024

(65) Prior Publication Data

US 2025/0307465 A1 Oct. 2, 2025

(51) Int. Cl.
*G06F 21/62* (2013.01)
*G06F 21/60* (2013.01)
*G06F 40/205* (2020.01)

(52) U.S. Cl.
CPC ........ *G06F 21/6254* (2013.01); *G06F 21/602* (2013.01); *G06F 40/205* (2020.01)

(58) Field of Classification Search
CPC .................................................. G06F 21/6254
See application file for complete search history.

(56) References Cited

U.S. PATENT DOCUMENTS

| | | | |
|---|---|---|---|
| 8,867,741 B2 | 10/2014 | Mccorkindale et al. | |
| 9,003,542 B1 | 4/2015 | MacKay et al. | |
| 10,318,729 B2 * | 6/2019 | Ford | G06F 21/6245 |
| 10,410,016 B1 | 9/2019 | Damick | |
| 11,093,632 B1 | 8/2021 | Ton-That | |
| 2006/0075228 A1 | 4/2006 | Black et al. | |
| 2017/0235848 A1 * | 8/2017 | Van Dusen | G06Q 30/0201 |
| | | | 705/12 |
| 2021/0248268 A1 * | 8/2021 | Ardhanari | G06N 20/00 |
| 2021/0256160 A1 | 8/2021 | Hachey | |
| 2022/0027508 A1 | 1/2022 | Rao | |
| 2023/0252190 A1 * | 8/2023 | Mossoba | G06F 21/6254 |
| | | | 726/26 |
| 2025/0165649 A1 * | 5/2025 | Bongiovanni | G06F 21/602 |

* cited by examiner

*Primary Examiner* — Simon P Kanaan
(74) *Attorney, Agent, or Firm* — ESPE Legal Consultancy FZ-LLC

(57) ABSTRACT

Systems and methods for large language model (LLM)-agnostic data anonymization. Data anonymization includes data obfuscation (and data deobfuscation) to protect confidential information a user is going to send to an LLM service or application programming interface (API). Encryption can be used for data obfuscation and particularly, for securing data from unauthorized access. Likewise, decryption can be used for data de-obfuscation.

20 Claims, 8 Drawing Sheets

200

100

200

Authenticate a user 202

Intercept request from user to upload document to LLM service 204

Parse document to extract document content 206

Detect confidential information (CI) within the document content 208

Obfuscate the detected CI 210

Redact the document by replacing the detected CI with the obfuscated CI 212

Upload the redacted document to the LLM service 214

A

200

A

Receive question from user through LLM service regarding uploaded redacted document 216

Receive answer from LLM service regarding question 218

Deobfuscate the obfuscated CI of the answer 220

Replace obfuscated CI in answer with deobfuscated CI 222

Present answer to user 224

DOCUMENT UPLOAD

SESSION FETCHING

400

402 User continues chat session

404 Document, chat history/sources decrypted

406 Azure Blob Storage

Redacted document fetched

408 PostgreSQL Database

Chat history, encryption items fetched

410 Decrypted document, chat history/sources displayed for user

LARGE LANGUAGE MODEL-AGNOSTIC DATA ANONYMIZATION

TECHNICAL FIELD

Embodiments relate to the field of data privacy. More particularly, embodiments relate to the anonymization of data interfacing with a large language model (LLM).

BACKGROUND

Data privacy, often called information privacy, is an area of data protection that concerns the proper handling of sensitive data including personal data but also other confidential data. Typically, data is protected to meet regulatory requirements as well as protecting the confidentiality and immutability of the data.

When users interact with LLMs (large language models), both for utilization and training, their personal or sensitive data is often used without restriction. Such treatment of data results in GDPR data privacy concerns. As a result, many users distrust LLMs and have stopped using these valuable tools. Therefore, there is a need for improved systems and methods of ensuring the privacy of sensitive and personal data for data protection in interacting with LLMs.

SUMMARY

Embodiments described or otherwise contemplated herein substantially meet the aforementioned needs of the industry. Embodiments described herein include systems and methods for In a feature and advantage of embodiments, systems and methods ensure data privacy for users of LLMs. For those who are distrustful of sending sensitive data to big LLM training corporations because the data may be used for model training, analytics, or even sold, embodiments allow such users to use LLM analytics without fear of handing over sensitive data.

In a feature and advantage of embodiments, systems and methods are particularly focused on data anonymization within the unique context of user interactions with LLMs. Accordingly, by concentrating on the intersection of data privacy and LLMs, systems and methods fill a crucial gap in the field of data security.

In an embodiment, a method of large language model (LLM)-agnostic data anonymization comprises authenticating a user to a system for data anonymization for a LLM; intercepting a request from the user to upload a document into an LLM service; parsing the document to extract document content; detecting confidential information (CI) within the document content; obfuscating the detected CI; redacting the document by replacing the CI with the obfuscated CI; uploading the redacted document to the LLM service; receiving at least one question from the user through the LLM service concerning the at least one redacted document; receiving at least one answer from the LLM service, wherein the at least one answer includes obfuscated CI; deobfuscating the obfuscated CI of the at least one answer; replacing the obfuscated CI of the at least one answer with the deobfuscated CI; and presenting the at least one answer to the user using a graphical user interface.

In an embodiment, a system for large language model (LLM)-agnostic data anonymization comprises a front end comprising a user interface engine configured to interface to a user device; and a back end comprising: at least one processor operably coupled to memory, and instructions that, when executed by the at least one processor, cause the at least one processor to implement: an authentication engine configured to authenticate a user to the system, an interception engine configured to intercept a request from the user to upload a document into an LLM service, a parsing engine configured to parse the document to extract document content, a detection engine configured to detect confidential information (CI) within the document content, an obfuscation engine configured to obfuscate the detected CI, a redaction engine configured to redact the document by replacing the CI with the obfuscated CI, a communication engine configured to upload the redacted document to the LLM service, and a deobfuscation engine configured to deobfuscate the obfuscated CI of at least one answer from the LLM service, the at least one answer including obfuscated CI, wherein the redaction engine redaction engine is further configured to replace the obfuscated CI with deobfuscated CI in the at least one answer, and wherein the user interface engine is further configured to present the at least one answer to the user.

In an embodiment, a method of large language model (LLM)-agnostic data anonymization comprises training a machine learning classifier using a dataset comprising a plurality of documents annotated with sensitive information labels; intercepting an LLM communication from a user; applying the machine learning classifier to detect sensitive information in the LLM communication; generating obfuscated information based on the sensitive information by encrypting the sensitive information using a user-specific private key; replacing the sensitive information with the obfuscated information in an obfuscated communication; and forwarding the obfuscated communication to the LLM in place of the intercepted LLM communication.

BRIEF DESCRIPTION OF THE DRAWINGS

Subject matter hereof may be more completely understood in consideration of the following detailed description of various embodiments in connection with the accompanying figures, in which.

Figure 1:
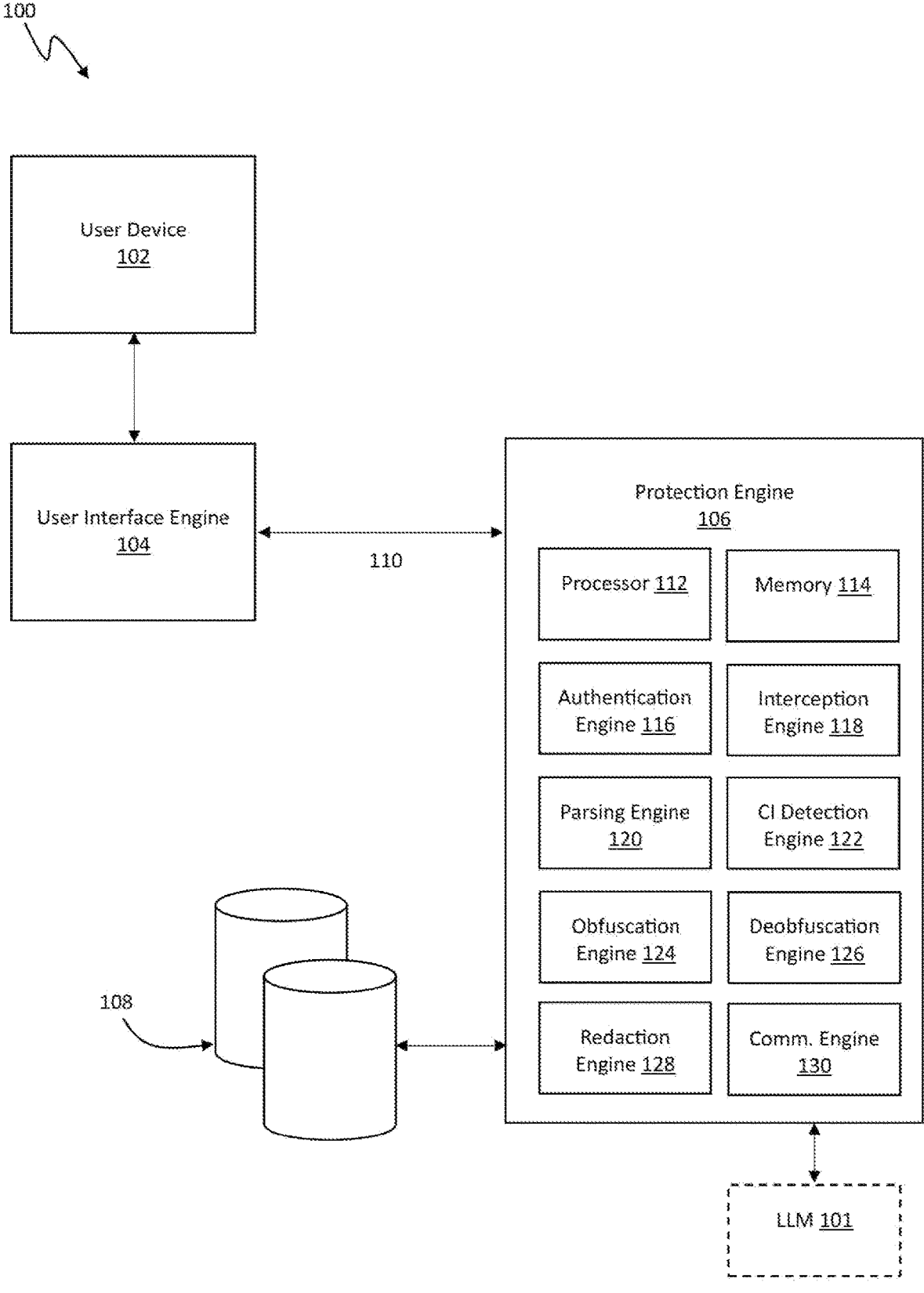
FIG. 1 is a block diagram of a system for data anonymization for a large language model, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Systems and methods for LLM-agnostic data anonymization. In an embodiment, data anonymization can include data obfuscation (and data deobfuscation) to protect confidential information a user is going to send to an LLM service or application programming interface (API). As described herein, obfuscation includes techniques to make data or code less clear or understandable. In an embodiment, encryption can be used for data obfuscation and particularly, for securing data from unauthorized access. Likewise, decryption can be used for data de-obfuscation.

As used herein, the terms "personal data," "personal information," "personally identifiable information (PII)," "sensitive data," "confidential information (CI)" and similar language do not reference any particular definition (e.g. associated with laws of particular jurisdiction), but rather are used interchangeably to mean data related to an identifiable person and can include data that is personal, sensitive, or otherwise identified according to user preference.

In an embodiment, a front-end website allows a user to upload documents, such as .DOC, .DOCX, PDF, etc. A user can then "chat" with a document by writing a question related to the document currently being used, which prompts a large language model, such as ChatGPT, with questions about the document. A back-end API provides functionality related to the document via the "chat" including detection and obfuscation related to the document, communicating redacted context and user submitted prompts to a large language model, deobfuscation of the output of any question alongside any parts of the document used to answer the question for the users eyes only.

Embodiments described herein include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein. In embodiments, system 100 can be implemented as a plugin to a software application like Word, an antivirus-like scanner of sending documents, or a chat parser. Components described herein can be implemented locally on the client or remotely in server and/or cloud.

Referring to FIG. 1, a block diagram of a system 100 for data anonymization for a large language model is depicted, according to an embodiment. System 100 generally comprises a user device 102, a user interface engine 104, a protection engine 106, and data storage 108 for communication of sensitive information with LLM 101.

User device 102 comprises a computing device operable by a user to interact with system 100. User device 102 can include a desktop computer, a laptop computer, tablet, or mobile computing device. In embodiments, user device 102 can be populated with or receive data from user interface engine 104.

As illustrated, user interface engine 104 comprises a front end and protection engine 106 comprises a back end of system 100. User interface engine 104 and protection engine 106 can be operably coupled over a communication channel 108. Communication channel 108 can be wired or wireless and be implemented according to any suitable protocol, such as Internet Protocol (IP), Wi-Fi, BLUETOOTH, or any other appropriate format.

User interface engine 104 is configured to present interfaces to a user via user device 102. For example, user interface engine 104 can comprise one or more web pages viewable on a web browser. In another example, user interface engine 104 can comprise an app installed on user device 102.

Protection engine 106 generally comprises a processor 112 and an operably coupled memory 114. A plurality of engines can be implemented by processor 112 using memory 114. Accordingly, protection engine 106 generally further comprises an authentication engine 116, an interception engine 118, a parsing engine 120, a confidential information (CI) detection engine 122, an obfuscation engine 124, a deobfuscation engine 126, a redaction engine 128, and a communication engine 130.

Authentication engine 116 is configured to authenticate a user of system 100. For example, a user (e.g. via user device 102) can be authenticated by validating username and password, PIN, token authentication, biometric authentication, or other suitable authentication information.

Interception engine 118 is configured to intercept a request from a user (e.g. via user device 102) to upload a document to an LLM service (e.g. LLM 101).

In an embodiment, interception of a request includes intercepting the document or a portion of the document inside a chatbot conversation of the LLM service (e.g. LLM 101). For example, intercepting can include inside a chatbot conversation before the data is sent to the LLM, such as where CI is copied/pasted or manually written (and not just in the document).

Interception engine 118 supports various interception methods, such as replacing the text input console with a custom text input console that performs the described operations before sending the data—modified or otherwise—to the original input interface, inserting code into applications to intercept or modify text inputs, or using network-level interception techniques. For example, using filtering, interception engine 118 is configured to analyze and process text input in real-time, identifying and obfuscating sensitive information before it reaches the LLM. Through code injection, the engine can modify the behavior of applications to intercept text inputs directly, allowing for the detection and modification of sensitive data. By sitting in-between applications, it acts as a middleware that intercepts and processes data between the user input interface and the network, ensuring that sensitive information is handled securely. As another example, network-level interception techniques enable the engine to capture and secure data as it travels across the network, applying obfuscation measures before it reaches external servers or services.

Additionally, the interception engine 118 facilitates the creation of plugins for text-editing software, like Microsoft Word, which can modify text through specific actions or scripting events such as save or read operations. This integration ensures the seamless functioning of data anonymization processes within existing software ecosystems, utilizing the application programming interfaces (APIs) of such platforms for compatibility and operational efficiency. In one example, using a Visual Studio Tools for Office (VSTO) add-in, a user can implement system 100 within their local installation of Microsoft Word.

In an embodiment, interception engine 118 is configured to determine that the same document is uploaded by a different second user. Specifically, in scenarios where it is identified that multiple users, such as colleagues within an office environment, are collaboratively working on the same document or task, the embodiments employ a standardized method for encoding or replacing sensitive data. This process involves the application of the same way for the identification and anonymization of sensitive information across user interactions with the document. For example, once a first user modifies a document, the interception engine 118 detects the changes and applies the standardized encoding or replacement of sensitive data, ensuring consistent anonymization across user interactions. If a first user and a second user modify a common document, the system dynamically tracks these modifications and applies the anonymization process accordingly. The system does not necessarily wait for the document to be checked back in by both users; instead, it processes changes in real-time or at specific checkpoints, ensuring that sensitive information is uniformly protected and anonymized throughout the collaborative process.

Parsing engine 120 is configured to parse a document such as a document uploaded by a user from user device 102. In an embodiment, parsing engine 120 can example the data present in a document and extract information from the document. For example, data from PDFs, CSV files and Word documents can be extracted and stored as a JSON file. The Parsing Engine 120 operates in two critical stages relative to the interaction with the LLM: before and after LLM processing. Initially, it examines the document to identify any sensitive data that needs to be altered, ensuring that only anonymized data is forwarded to the LLM for processing. This preemptive parsing aims to remove or anonymize sensitive information, thus safeguarding user privacy. Subsequently, after the LLM has processed the document, the Parsing Engine re-examines the output to correct any sensitive data that may have been introduced or overlooked during the LLM's operation. This post-processing step ensures that the final document remains compliant with privacy standards before being returned to the user.

Confidential information (CI) detection engine 122 is configured to detect confidential information within the parsed data. In an embodiment, CI or sensitive data can be detected by applying context searching, such as by searching for a predefined list of words and modifications.

In another embodiment, CI or sensitive data can be detected by applying a machine learning classifier. For example, a machine learning classifier can be pretrained using a dataset comprising a plurality of documents annotated with labels (e.g. CI, PII, "sensitive data"). In an embodiment, the dataset used for pretraining the machine learning classifier is updated periodically to account for updated CI and evolving CI. In another embodiment, updates to the machine learning classifier, used for detecting Confidential Information (CI) or sensitive data, can be implemented on an as-needed basis. For instance, updates can be initiated when new types of sensitive information are identified that require processing. Initially, the set of CI is defined prior to the commencement of operations with the Large Language Model (LLM) and typically remains static throughout the life of a document. However, specific circumstances, such as the introduction of new regulations, may necessitate an update to the document processing workflow.

A machine learning classifier can be defined by a model. In an embodiment, a model can be a Named Entity Recognition (NER) model. A NER model can be trained according to a Contract Understanding Atticus Dataset (CUAD). CUAD includes labels for commercial legal contracts that identify types of legal clauses that are considered important in contact review in connection with a corporate transaction, including mergers and acquisitions, etc. and is annotated for a NER task. In embodiments, CUAD documents are retrieved from the EDGAR database. Metrics used for the NER task include accuracy, recall, precision, F1-score, entity-level and token-level evaluation (evaluation can be performed at the level of entire entities or individual tokens). In embodiments, the machine learning classifier can be trained using only internal or only external sources. Embodiments are therefore flexible in its approach, allowing for the use of externally pretrained models such as ChatGPT, models fully trained within the organization, or external models that are fine-tuned on an organization's specific dataset.

Once trained, the classifier can identify CI or sensitive data within the parsed data.

In an embodiment, the trained NER model can be further utilized for semantic search to better anonymize data. For example, the NER model can be used for weak labelling, creating an anonymized dataset of legal documents that can be used to pretrain and fine-tune a second model. Upon the completion of training the NER model, which can be applied for semantic search to enhance data anonymization, further utilization encompasses the development of a secondary model. This secondary model leverages the anonymized dataset created through weak labeling by the NER model. Additionally, embodiments can employ Retrieval-Augmented Generation (RAG) databases, particularly those based on vector representations, to facilitate the search process. This involves replacing CI prior to the encoding of vectors into such databases, thereby ensuring the maintenance of anonymity throughout the data handling process. For example, if a legal document contains the name of a person "John Bit" identified as CI, the NER model could replace "John Bit" with a unique identifier or token. This token then gets mapped to a vector in the RAG database. Instead of storing "John Bit" directly, the database stores a vector representation that is decoupled from the original text but retains the semantic meaning necessary for document analysis and retrieval, ensuring that "John Bit" remains anonymous throughout the data handling process. Building upon the capabilities of the NER model and RAG databases, this embodiment introduces an advanced technical solution for managing sensitive information in interactions with LLMs. By employing modern RAG techniques, the system securely stores the essence of new materials, including confidential information, within a vector database. This approach enables efficient search for relevant materials and the reconstruction of original text for conversation context with LLMs, ensuring sensitive information is obfuscated during embedding generation and processed to eliminate CI derivatives from the RAG vector database. This technical advancement not only prevents data leaks during interactions with AI agents but also optimizes the storage and processing of confidential information.

In an embodiment, the machine learning classifier is configured to recognize multiple categories of CI including personal names, addresses, and financial information. In an embodiment, a feedback loop about the data anonymization can be used for retraining of the machine learning classifier. In an embodiment, a feedback loop includes re-analyzing the uploaded document based on additional user interaction with the document after initial upload. A feedback loop involves the iterative refinement of the classifier to enhance its ability to identify and remove CI during any user interaction or when integrating data from other models that might introduce CI into the training dataset. Utilizing techniques such as text search, potentially with wildcards, and the modification of dictionaries to account for word forms and synonyms, the system aims to continually improve its effectiveness in anonymizing data.

Obfuscation engine 124 is configured to generate obfuscated data for the identified sensitive data. In an embodiment, obfuscation engine 124 is configured to generate one or more embeddings for the document, such that an embedding corresponds to a given CI. In an embodiment, obfuscation engine 124 is configured to obfuscate the detected CI by an encryption mechanism using a private key of the user. In an embodiment, obfuscation engine 124 is configured to obfuscate the detected CI by using a list including a list of replacements for certain CI. In an embodiment, the list is a one-to-one replacement (word x is replaced by obfuscated word y). In an embodiment, obfuscation engine 124 is configured to obfuscate the detected CI by use of hashing and a replacement dictionary.

Deobfuscation engine 126 is configured to generate corresponding plaintext or non-obfuscated data from the obfuscated data. In an embodiment, deobfuscation engine 126 is configured to generate non-obfuscated data based on one or more embeddings in the document. In an embodiment, deobfuscation engine 126 is configured to generate non-obfuscated data based on a decryption mechanism using a symmetrical key. In an embodiment, deobfuscation engine 126 is configured to generate non-obfuscated data based on a list of replacements (obfuscated word y is replaced by deobfuscated word x). In an embodiment, deobfuscation engine 126 is configured to generate non-obfuscated data by hashing and a replacement dictionary.

For example, in the context of obfuscating sensitive data using hashing and a replacement dictionary, when a particular word "WORD" is identified for obfuscation, it is processed through a hash function, possibly incorporating a salt for enhanced security. The resulting one-way hash is textually represented and cataloged in a dictionary for both directions of translation—from "WORD" to its hash form and vice versa. During the obfuscation phase, any occurrence of "WORD" in the plaintext is substituted with its corresponding hash. Conversely, during deobfuscation, hashes identified in the text processed by the LLM are reverted to their original "WORD" form for user presentation, ensuring a secure and reversible data handling method within the system.

Redaction engine 128 is configured to generally hide sensitive information with coded information. As used herein, redaction means modifying the document with embeddings to hide sensitive information. Accordingly, redaction can include sanitation, such as replacing entities with generic names like ORG, PERSON). Redaction can include pseudo-anonymization where sensitive information is replaced with false information (e.g. company/person names are replaced with fake names). Redaction can also include insertion of encrypted sensitive information in the place of the actual sensitive information. The Redaction Engine 128 can also employ alternative strategies that involve utilizing uniquely generated words from a pre-established dictionary. These words, which are not present in the document and are typically devoid of any meaning that could be misinterpreted by the Large Language Model (LLM), serve as substitutes for sensitive data.

Communication engine 130 is configured to communicate with data storage 108 and LLM 101. In embodiments, communication engine 130 can be instructed by other engines to retrieve or store data in data storage 108. In embodiments, communication engine 130 can be instructed to upload the redacted document to LLM 101. In an embodiment, uploading is performed by using a secure communication protocol that employs end-to-end encryption to protect the confidentiality of data transmitted between the user and system 100 (and LLM 101).

Data storage 108 comprises one or more databases for storing data related to system 100. In an embodiment, data storage comprises three separate databases. In an embodiment, a first database is blob storage such as Azure Blob Storage configured for storing redacted documents. In an embodiment, a second database is configured for storing data related to users, chat history, documents, and encrypted document entities that alongside securely stored cryptographic keys can decrypt documents for related users only, such as PostgreSQL database. In an embodiment, a third database is configured for storing embeddings of encrypted document text, used for Retrieval Augmented Generation, such as Qdrant Vector Database.

In an embodiment, data storage 108 is configured to store user questions and corresponding answers (both obfuscated and deobfuscated, in embodiments). In an embodiment, data storage 108 is configured to store a log of operations of obfuscation/deobfuscation operations. In embodiments, such log data can be used to generate an audit trail detailing the actions taken on the redacted document and resulting answer (e.g. as retrieved by communication engine 130).

In an embodiment, protection engine 106 conserves the chat sessions for users. The conservation of chat sessions by protection engine 106 can be achieved through real-time processing within the filter mechanism or via other methods, such as writing data to disk. Importantly, the dictionary utilized for translating between sensitive words and their obfuscated counterparts, as discussed above, is persistent. This allows for the retrieval and continuation of conversations from previous sessions with the LLM, providing a seamless user experience across different interactions. For example, the dictionary that translates between sensitive words and their obfuscated counterparts is maintained in a database that is linked to each user session through unique session identifiers. When a chat session is initiated, the Protection Engine 106 retrieves the relevant dictionary for that session using the session identifier. This ensures that any sensitive information previously identified and obfuscated can be consistently managed across sessions. The dictionary is stored separately but is associated with each session through metadata that connects the session ID to the specific dictionary entries used, allowing for seamless continuation and coherence in user interactions with the LLM.

In operation, in an embodiment, obfuscation can include encryption. A document is submitted from a user via user device 102 and user interface engine 104 after the user is authenticated by authentication engine 116. The document submission is intercepted by interception engine 118 and parsed by parsing engine 120. CI detection engine 122 applies a NER model to analyze the parsed document for CI. The detected CI is then encrypted by obfuscation engine 124 using Advanced Encryption Standard (AES) encryption in Cipher Block Chaining (CBC) mode. This process takes a cryptographic key for both encryption and decryption, and outputs a hash of the encrypted item (e.g. EC3Y+EjcIPL-IZhrGO+eP+HRKodaC4RNcCsccKz+I3ow=), which is then inserted into the document instead of the CI by redaction engine 128.

In an embodiment, a list of all the encrypted items, including information about its entity type (e.g. COMPANY, PERSON, LOCATION) is also output by communication engine 130 to database(s) 108. This information (encryption data), alongside the hash, is saved in a PostgreSQL database. When all instances of detected CI have been replaced in the document, the document is then saved in an Azure Blob Storage instance.

In an embodiment, deobfuscation can include decryption. Decryption can be implemented by deobfuscation engine 126 at certain stages and uses the aforementioned cryptographic key alongside the encryption data to decrypt information for the users. For example, decryption can be done on documents when displaying to a user, for answers generated by the LLM and LLM sources, for chat history (e.g. sources are decrypted when a user is returning to their document chat session).

In an embodiment, LLM 101 provides an answer to a user question. For example, the user can interact with LLM 101 using a natural language query. In an embodiment, LLM can respond to the question with obfuscated data that can include a textual response generated by the LLM service (e.g. a name pronounced or written), text from the document, the document itself, or a processed image including a redacted portion (e.g. pictures or video with replaced CI-like logo).

In operation of an add-in (e.g. VSTO add-in to Microsoft Word), a user can choose automated redaction through a Named Entity Recognition (NER) model that finds relevant CI. In an embodiment, the add-in can automatically and without user input perform the redaction described herein, in another embodiment, a user can select which fields to redact. Various ways of redacting can be implemented using an add-in, including by replacing CI with placeholder names ("Lucas"→"PERSON1", "Irina"→"PERSON2", "Example Company, Inc."→"COMPANY1", "+4512345678"→"PHONE_NUMBER1" etc.), saving this mapping locally (e.g. a CSV file), or AES encryption with a user provided cryptographic key, as described above. In a specific example, an NER model finds data to redact. Within Microsoft Word via the add-in, a user can select which entities to anonymize (e.g. in the user selection embodiment). A user can also deanonymize their document. If the anonymized approach is by replacing CI with placeholder names, the mapping can be loaded, replacing the placeholder names with the actual names, or by decrypting with the user's cryptographic key. In an embodiment, a user can further deanonymize an entire document at once, or choose singular entities one at a time.

In an embodiment, the user questions and corresponding answers (both obfuscated and deobfuscated, in embodiments) can be stored in a system 100 database. In embodiments, such intermediate storage aids in data recall such that system 100 can, in certain cases, use the previously-deobfuscated data in the response to a user question instead of expending processing resources to do the same deobfuscation again. In embodiments, such storage is also efficient for data retention and audit purposes. The storage of user questions and corresponding answers facilitates the reuse of similar prompts for generating questions to different LLMs or for repeating sessions upon user request. This capability enhances the system's flexibility and efficiency in interacting with various LLMs and in providing a consistent user experience, allowing for the replication of query contexts or the continuation of previous discussions without requiring the user to reinitiate the entire conversation.

In an embodiment, system 100 can implement a lightweight classifier derived by the model on user device 102. For example, back-end protection engine 106 can implement the processor and data-intensive training of the model, and user interface engine 104 can implement a lightweight classifier that is not trained on the user device. The implementation of a lightweight classifier on user devices as part of system 100 is characterized by its ability to operate independently of High-Performance Computing (HPC) clusters, which are typically required for the processing demands of larger LLMs. This definition of "lightweight" means that the classifier derived by the model is sufficiently efficient to run on user devices for at least inference purposes, without the need for extensive computational resources. In another embodiment, system 100 implements a lightweight classifier that is originally trained as described above (not on the user device) and is configured for simplified retraining on user device, again without the need for extensive computational resources. In addition to the lightweight classifier's capabilities, the system contemplates a refined approach to model adaptation on user devices, emphasizing minimal resource consumption. This approach includes the potential for a simplified retraining process, optimized through methods such as Low-Rank Adaptation (LoRA) and its quantized variant (QLoRA), tailored for efficiency. Various training mechanisms can be used for simplified training, including pretraining, finetuning, reinforcement learning from human feedback (RLHF), as well as implementing adapters. Adapters, small trainable modules inserted between a model's layers, require updating only for new tasks, significantly reducing computational demands. This method allows for the swift adaptation of large language models to new domains with minimal impact on computational resources, demonstrating an effective approach to model training and deployment in resource-constrained environments.

Figure 2A:
FIGS. 2A-2B are a flowchart of a method of data anonymization using a large language model, according to an embodiment.
Figure 2A:
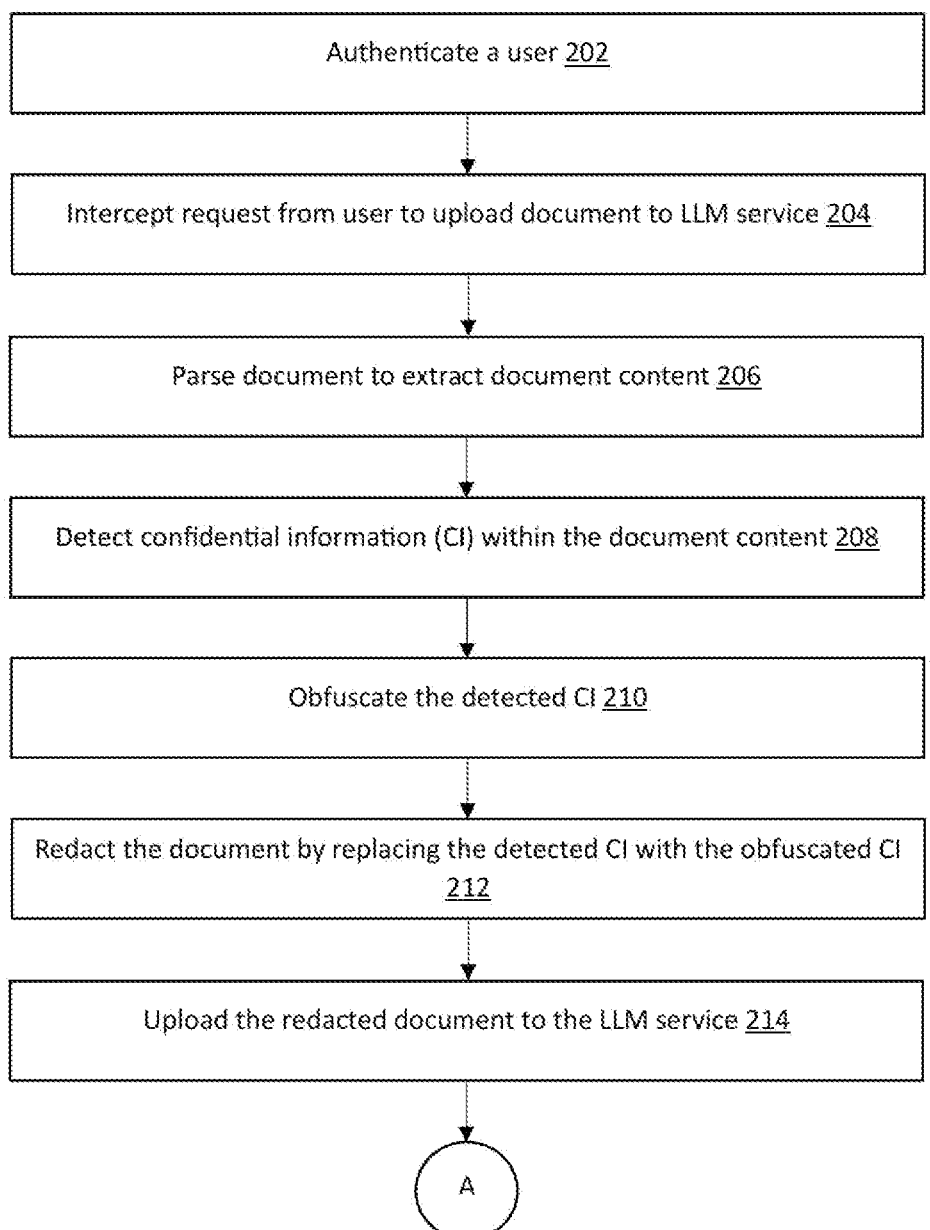
Figure 2B:
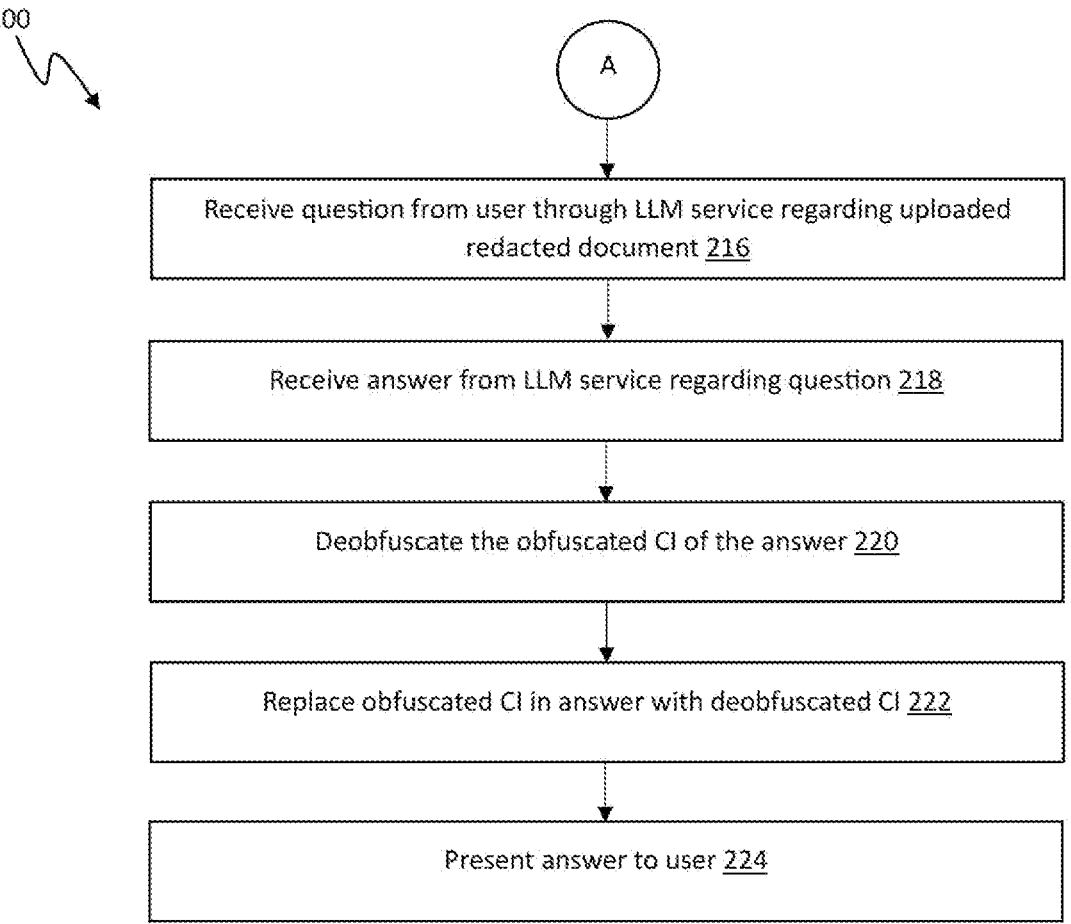

Referring to FIGS. 2A-2B, a flowchart of a method 200 of data anonymization for a large language model is depicted, according to an embodiment. Method 200 or portions of method 200 can be implemented by system 100.

At 202, a user is authenticated. For example, authentication engine 116 can authenticate the user of user device 102.

At 204, a request from a user to upload a document into an LLM service is intercepted. For example, interception engine 118 can intercept a document request from user device 102.

At 206, the document is parsed to extract document content. For example, parsing engine 120 can parse the intercepted document to obtain one or more portions of the document.

At 208, confidential information (CI) is detected within the document content. For example, CI detection engine 122 can detect sensitive information within the document content or the user's interaction with the document.

At 210, the detected sensitive information (e.g. CI) is obfuscated. For example, obfuscation engine 124 can obfuscate the content.

At 212, the document is redacted by replacing the CI with the obfuscated CI. For example, redaction engine 128 can redact the CI by replacement with the obfuscated CI generated at 210.

At 214, the redacted document is uploaded to the LLM service. For example, communication engine 130 can upload the redacted document to LLM 101.

At 216, a question is received from the user through the LLM service concerning the redacted document. For example, a user (via user device 102) can communicate a question to LLM 101, such as "get my document." In an embodiment, interception engine 118 is configured to intercept the question.

At 218, an answer from the LLM service is received. In an embodiment, the answer includes obfuscated CI. For example, LLM 101 retrieves the answer-which includes the user's obfuscated CI-using its LLM.

At 220, the obfuscated CI of the answer is deobfuscated. For example, the plaintext or deobfuscated data corresponding to the obfuscated CI can be determined by deobfuscation engine 126.

At 222, the obfuscated CI of the answer is replaced with the deobfuscated CI. For example, redaction engine 128 can replace the obfuscated CI with the plaintext or deobfuscated data determined by deobfuscation engine 126.

At 224, the answer is presented to the user using a graphical user interface. For example, user interface engine 104 can present the answer (including the plaintext or deobfuscated data) via user device 102. In an embodiment, presentation of the answer to the user is accompanied by an audit trail detailing the actions taken on the redacted document and resulting answer.

Figure 3:
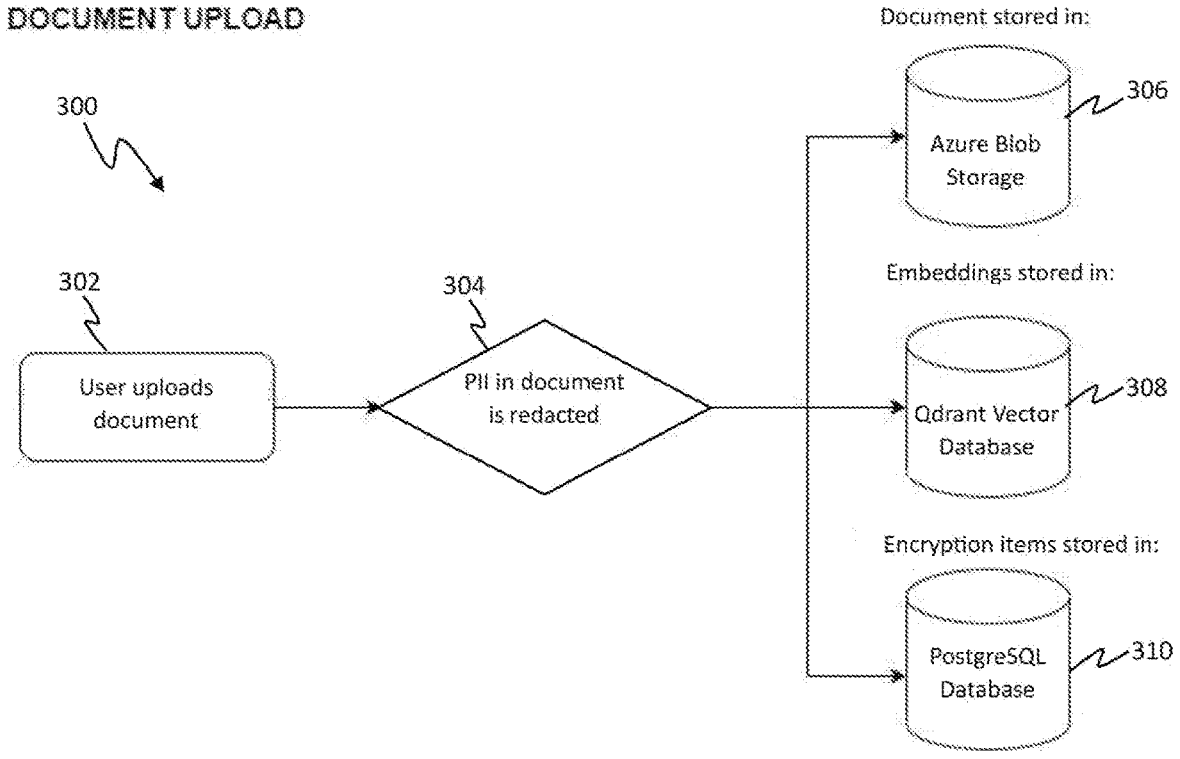
FIG. 3 is a flowchart of a method of document upload, according to an embodiment.
Figure 4:
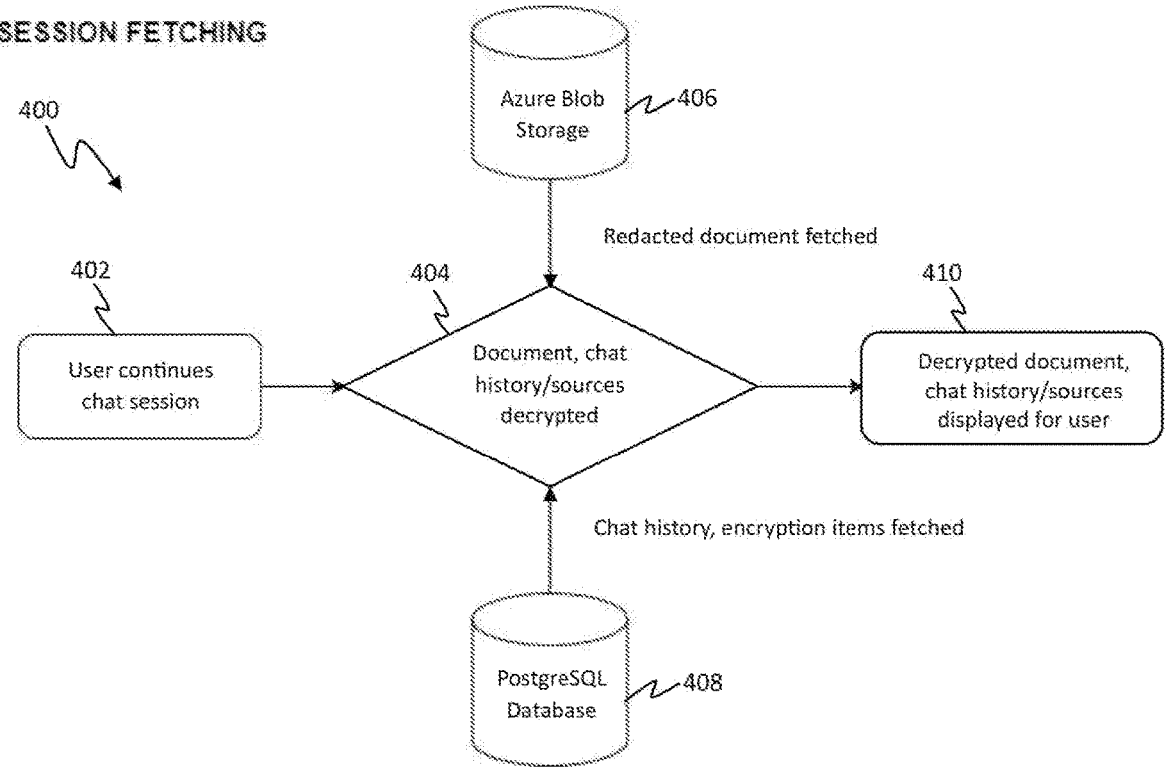
FIG. 4 is a flowchart of a method of session fetching, according to an embodiment.
Figure 5:
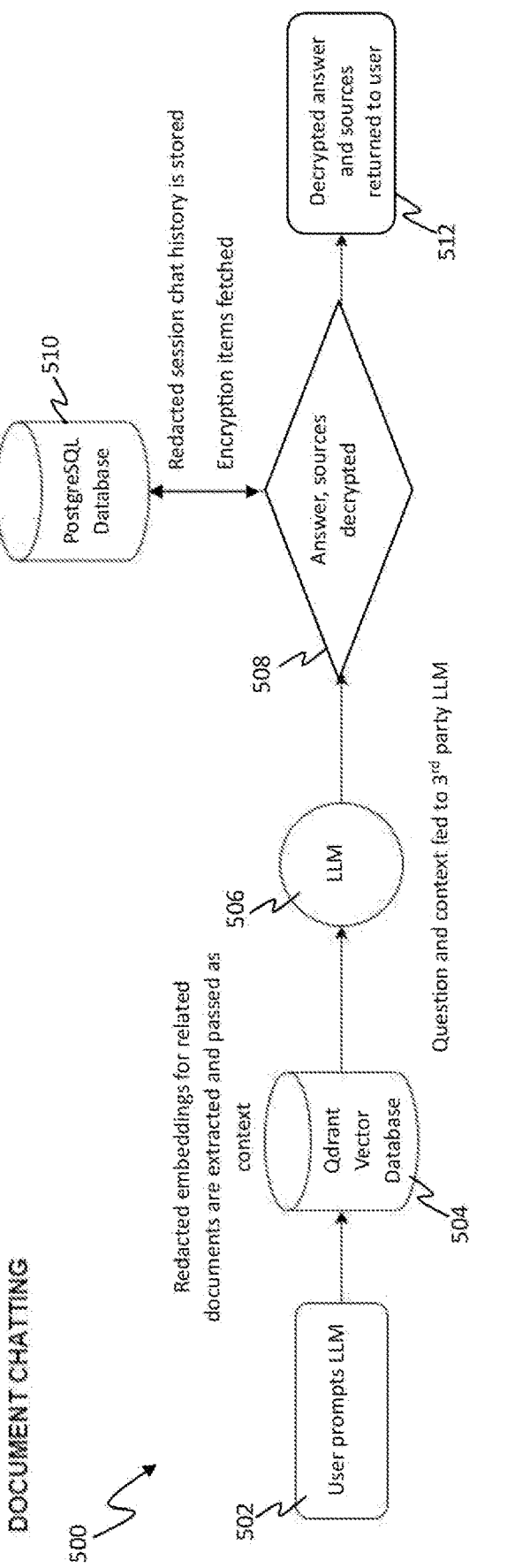
FIG. 5 is a flowchart of a method of document chatting, according to an embodiment.

Referring to FIGS. 3-5, FIG. 3 "Document Upload", "Session Fetching" and "Document Chatting" illustrate the flow of data in the three primary ways a user can interact with a document in the system (e.g. system 100). Referring to FIG. 3, a flowchart of a method 300 of document upload is depicted, according to an embodiment. At 302, a user uploads a document to an LLM service. At 304, the "PII" (CI or sensitive information) in the document is redacted, including by encrypting certain sensitive data in the document, replacing that data with a corresponding encrypted hash, to essentially "redact" the document. At 306, the redacted document is uploaded to an Azure Blob Storage container. At 308, embeddings are created of the redacted document and stored in a Qdrant Vector Database. At 310, the specific encrypted hashes are stored in a Postgres Database for future decryption to display a non-redacted version of a document to a user, or decrypt answers/sources from the LLM for the user.

Referring to FIG. 4, a flowchart of a method 400 of session fetching is depicted, according to an embodiment. Method 400 of session fetching is generally implemented when a user reopens a document (e.g. previously uploaded a first document, chatted with a second document and comes back to the first document). At 402, a user continues a chat session with the first document. At 404, based on data stored in blob storage 406 (e.g. Azure Blob Storage) and a SQL database 408 (e.g. PostgreSQL), the document and chat history and sources are decrypted (or otherwise deobfuscated). In other words, the document is effectively reassembled with deobfuscated data. At 410, the deobfuscated document and chat histories and sources are displayed to the user.

Referring to FIG. 5, a flowchart of a method 500 of document chatting is depicted, according to an embodiment. Method 500 of document chatting is generally implemented as the only direct user interaction with an LLM. In an embodiment, method 500 is called Retrieval Augmented Generation (RAG), such that the users document is used as context for the LLM to answer questions. For example, at 502, the user prompts the LLM. At 504, method 500 redacts the user's question and retrieves the (redacted) embedded document from a Qdrant database. At 506, the redacted question and redacted document are sent to the LLM. At 508, when the model has generated an answer and sources, the answer (and possibly sources) are decrypted because they contain hashes/encrypted data. At 510, encrypted items are fetched from a database (e.g. PostgreSQL database). At 512, after the answer is decrypted, the decrypted answer is displayed to the user.

Figure 6:
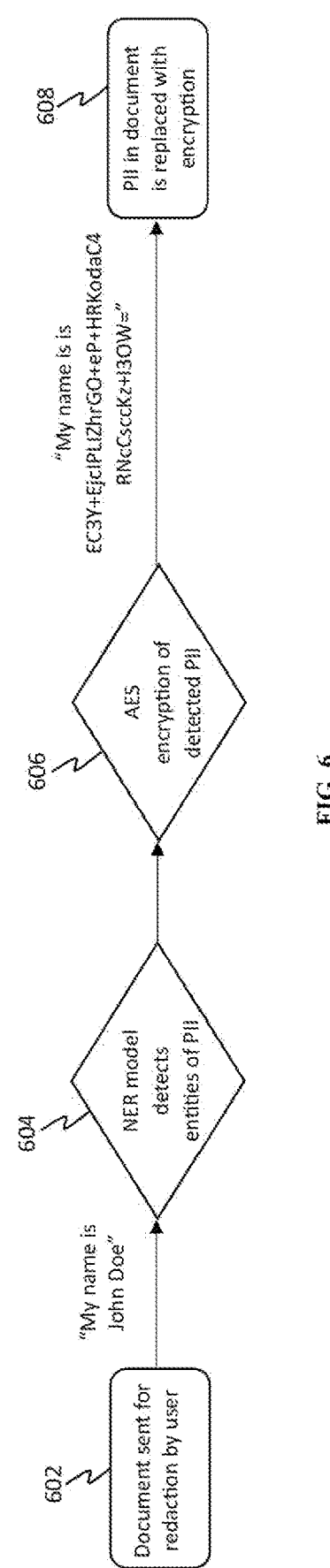
FIG. 6 is a flowchart of a method of sensitive information encryption, according to an embodiment.

Referring to FIG. 6, a flowchart of a method 600 of sensitive information encryption is depicted, according to an embodiment. Method 600 generally depicts one embodiment (encryption) of obfuscating data in a document using encryption embeddings. At 602, the document is sent by a user and received or intercepted by the system. For example, the document can contain the PII "My name is John Doe." At 604, a NER model detects PII "John Doe." At 606, AES encryption encrypts "John Doe" to an encryption string. At 608, "John Doe" is replaced with the encryption string in the document.

Figure 7:
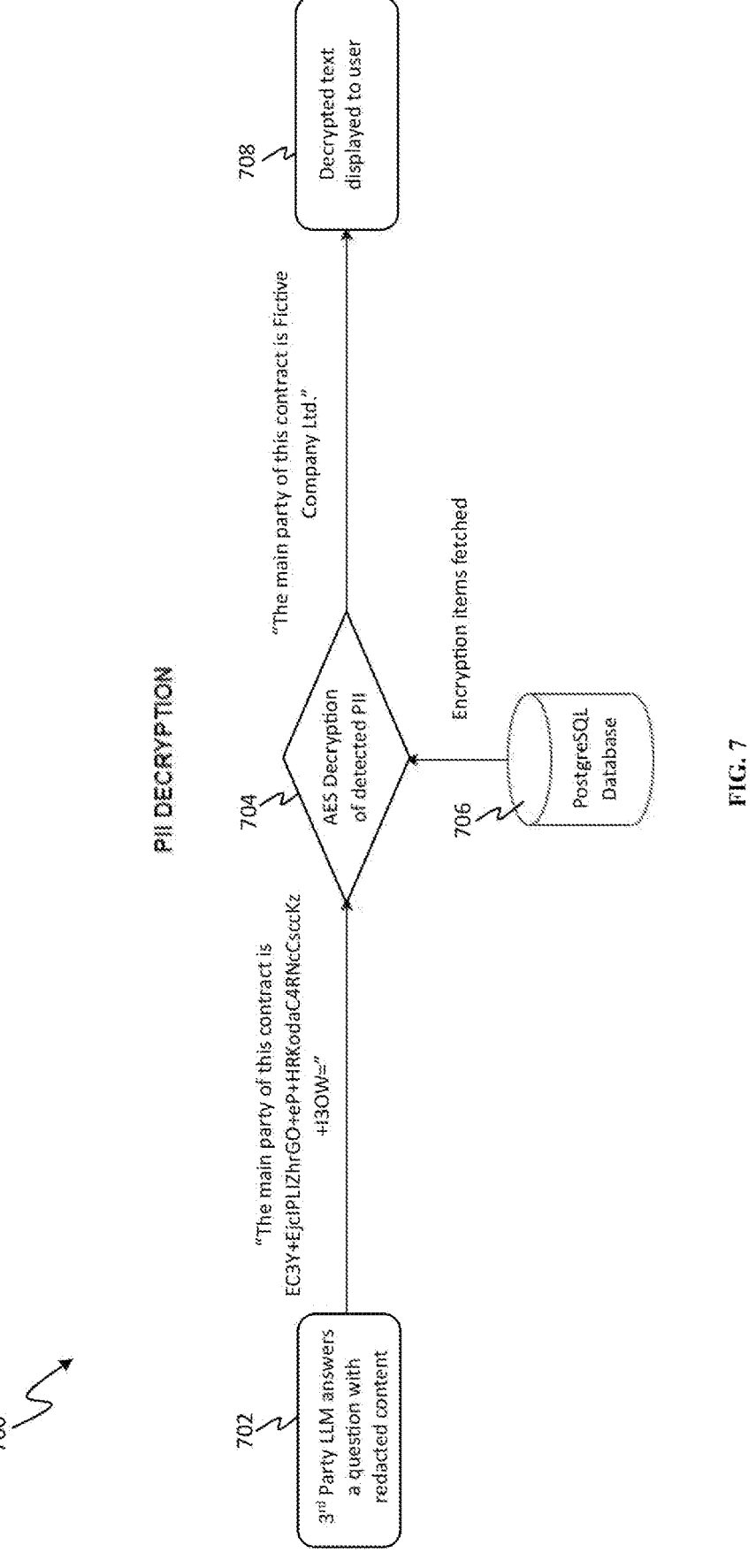
FIG. 7 is a flowchart of a method of sensitive information decryption, according to an embodiment.

Referring to FIG. 7, a flowchart of a method 700 of sensitive information decryption is depicted, according to an embodiment. Method 700 generally depicts one embodiment (decryption) of deobfuscating data in a document using encryption embeddings. At 702, an LLM answers a question (posed by a user) that includes redacted content. For example, the redacted content can include "The main part of this contract is [encryption string]." At 704, AES decryption is used to decrypt the encryption embedding(s) using encryption items fetched from a database (e.g. PostgreSQL database) at 706. At 708, the decrypt encryption embeddings in the answer are replaced with the decrypted data and presented to the user.

Data anonymization of texts for NLP and LLM applications therefore often contain personally identifiable information (PII) or other sensitive information. Accordingly, data anonymization for an LLM can include for medical transcripts (e.g. including patient names, addresses, social security numbers), customer support chats and call center recordings (e.g. including names, contact numbers, addresses, account details, other specific information), and for legal documents (e.g. including names, addresses, dates, other sensitive details).

In a particular example of legal documents, and more particularly for contract analysis, when third-party tools or cloud services are used, contracts can be anonymized to protect sensitive information. In particular, embodiments are applicable to e-discovery (present relevant documents to clients, especially when multiple parties are involved, to protect privileged information) and regulatory compliance. Benefits include data protection and privacy, enhancing client trust, collaborations, and third-party integrations (integrate third-party tools without the fear of exposing sensitive data, e.g. ChatGPT plugins), data storage (some jurisdictions have stringent data residency requirements. Anonymized data can be stored in cloud or localized data storages that might otherwise be problematic).

Data anonymization described herein therefore facilitates data privacy regulations. Data can be anonymized to achieve GDPR standards, and further to anonymize all confidential information. In an embodiment, since the resulting encrypted data is stored in a database (e.g. PostgreSQL), improved security is further achieved by leveraging PostgreSQL encryption, which can further encrypt data stored. Further, in embodiments, each user can have its own private encryption key. In embodiments, security is further improved by storing encrypted data locally (on a user device), which is only uploaded when decrypting. Therefore, encrypted data is never stored on the back-end. In further embodiments, system encryption services can be deployed to a user device so that decrypted data never leaves the user's machine.

The invention claimed is:

1. A method of large language model (LLM)-agnostic data anonymization, the method comprising:
   authenticating a user to a system for data anonymization for a LLM;
   intercepting a request from the user to upload a document into an LLM service;
   parsing the document to extract document content;
   detecting confidential information (CI) within the document content;
   obfuscating the detected CI;
   redacting the document by replacing the CI with the obfuscated CI;
   uploading the redacted document to the LLM service;
   receiving at least one question from the user through the LLM service concerning the at least one redacted document;
   receiving at least one answer from the LLM service, wherein the at least one answer includes obfuscated CI;
   deobfuscating the obfuscated CI of the at least one answer;
   replacing the obfuscated CI of the at least one answer with the deobfuscated CI; and
   presenting the at least one answer to the user using a graphical user interface.

2. The method of claim 1, wherein the detecting confidential information (CI) within the document content is performed by one of:
   applying a machine learning classifier to the document content; or
   applying context searching using a pre-defined list of words and word modifications.

3. The method of claim 1, wherein obfuscating the detected CI is performed using one of:
   an encryption mechanism using a private key of the user;
   a list of replacements; or
   a hashing and replacement dictionary.

4. The method of claim 3, wherein deobfuscating the obfuscated CI of the at least one answer is performed using one of:
   a decryption mechanism using a symmetrical key;
   a list of replacements; or
   a hashing and replacement dictionary.

5. The method of claim 1, wherein document content includes text of the document, pictures of the document, metadata of the document comprising name of the file, extended attributes, hidden fields, author of document, comments, and revision history.

6. The method of claim 1, wherein intercepting the request includes interception of the request to send the document or a portion of the document inside a chatbot conversation of the LLM service.

7. The method of claim 2, wherein the machine learning classifier is pretrained using a dataset comprising a plurality of documents annotated with CI labels, wherein the dataset used for pretraining the machine learning classifier is updated periodically.

8. The method of claim 2, further comprising generating a feedback loop based on the obfuscating the detected CI and retraining of the machine learning classifier based on the feedback loop.

9. The method of claim 1, wherein the at least one answer is at least one of:
   a textual response generated by the LLM service;
   text from the document;
   the document; or
   a processed image including a redacted portion.

10. The method of claim 1, further comprising saving at least one question from the user and the at least one answer in a database.

11. The method of claim 1, wherein obfuscating the detected CI further comprises receiving selection of CI through an application add-in.

12. The method of claim 1, wherein presenting the answer to the user includes an audit trail of actions taken on the document and the answer.

13. A system for large language model (LLM)-agnostic data anonymization, the system comprising:
   a front end comprising a user interface engine configured to interface to a user device; and
   a back end comprising:
      at least one processor operably coupled to memory, and
      instructions that, when executed by the at least one processor, cause the at least one processor to implement:
         an authentication engine configured to authenticate a user to the system,
         an interception engine configured to intercept a request from the user to upload a document into an LLM service,
         a parsing engine configured to parse the document to extract document content,
         a detection engine configured to detect confidential information (CI) within the document content,
         an obfuscation engine configured to obfuscate the detected CI,
         a redaction engine configured to redact the document by replacing the CI with the obfuscated CI,
         a communication engine configured to upload the redacted document to the LLM service, and
         a deobfuscation engine configured to deobfuscate the obfuscated CI of at least one answer from the LLM service, the at least one answer including obfuscated CI,
   wherein the redaction engine redaction engine is further configured to replace the obfuscated CI with deobfuscated CI in the at least one answer, and
   wherein the user interface engine is further configured to present the at least one answer to the user.

14. The system of claim 13, wherein the detection engine is configured to detect the confidential information (CI) within the document content by one of:

applying a machine learning classifier to the document content; or applying context searching using a pre-defined list of words and word modifications.

15. The system of claim 13, wherein the obfuscation engine is configured to obfuscate the CI including by at least one of:

an encryption mechanism using a private key of the user;

a list of replacements; or a hashing and replacement dictionary.

16. The system of claim 15, wherein the deobfuscation engine is configured to deobfuscate the obfuscated CI of the at least one answer including by at least one of:

a decryption mechanism using a symmetrical key;

a list of replacements; or a hashing and replacement dictionary.

17. The system of claim 14, wherein the machine learning classifier is pretrained using a dataset comprising a plurality of documents annotated with CI labels, wherein the dataset used for pretraining the machine learning classifier is updated periodically.

18. The system of claim 14, wherein the machine learning classifier is retrained using a feedback loop for the obfuscating of the detected CI.

19. The system of claim 13, wherein intercepting the request includes interception of the request to upload the document or a portion of the document inside a chatbot conversation of the LLM service.

20. The system of claim 13, wherein presenting the answer to the user includes an audit trail of actions taken on the document and the answer.

\* \* \* \* \*